April 21, 1959 E. F. GRANT 2,883,540

MICROWAVE SIGNAL GENERATING SYSTEM

Filed July 31, 1956

Inventor
Eugene F. Grant
By Robert S. Toperzer
Atty.

United States Patent Office
2,883,540
Patented Apr. 21, 1959

2,883,540

MICROWAVE SIGNAL GENERATING SYSTEM

Eugene F. Grant, Marblehead, Mass., assignor to National Company, Inc., Melrose, Mass., a corporation of Massachusetts Application July 31, 1956, Serial No. 601,321

6 Claims. (Cl. 250—36)

Figure 1:
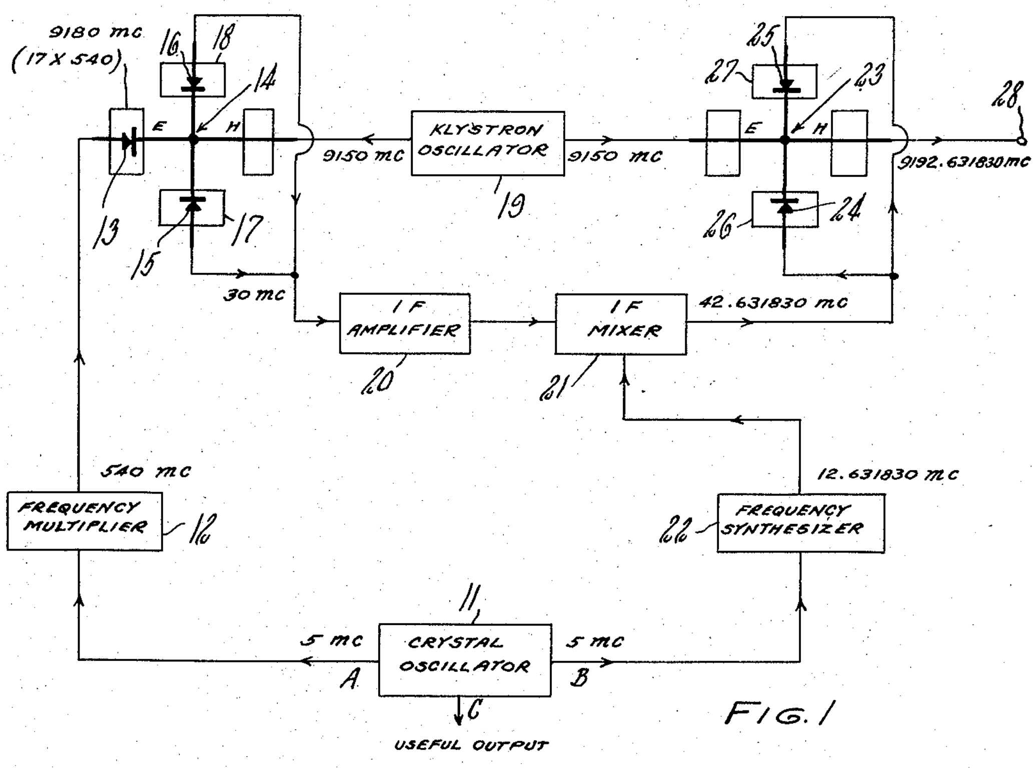

This invention relates generally to the synthesis of radio frequency signals, and more particularly it relates to the synthesis of a relatively high power microwave signal having a predetermined controlled frequency.

In various types of electronic systems it is often required as an intermediate function to provide a signal whose frequency is absolutely controlled by that of another signal. This function is performed in most systems with relatively conventional circuitry well known to those skilled in the art. Where the signal whose frequency is to be controlled lies in the microwave range, however, such conventional circuitry is often inapplicable because of its inherent frequency limitations. It is to the derivation of a relatively high power microwave signal having a frequency absolutely controlled by a signal of standard unrelated frequency outside the microwave range that the present invention is directed.

An example of where such a signal is required, which serves to illustrate the special problem involved, is in a frequency standard based on an atomic resonance of an element, for example of cesium. In order to operate a cesium atomic beam tube, a relatively high power microwave signal must be provided which has substantially the same frequency as the lowest atomic resonance frequency of cesium, namely 9192.63183 megacycles (mc.). As is apparent, a signal of this frequency would have little utility as a standard frequency for the calibration of other apparatus. But this frequency can be made useful by providing a system wherein one or more signals are generated having frequencies outside the microwave range which signals are absolutely locked in with the atomic resonance frequency, the precise frequency of frequencies of these signals being chosen with regard to the particular use to which the atomic frequency standard is to be put. In the ordinary case no particular relation will exist between the useful output frequency or frequencies and the atomic resonance frequency so that conventional frequency multiplication and signal amplifying techniques will be inappropriate. Even in an application where the useful output signal frequency is integrally related to the atomic resonance frequency or can be so related, the problem still remains to provide a signal at the atomic resonance frequency which has a relatively high power level such as is required for the operation of an atomic beam tube. In other words, even assuming that a harmonic component having the same frequency as the atomic resonance frequency has been derived from the useful output signal, it remains to amplify such harmonic signal sufficiently to achieve the necessary output level to operate the atomic beam tube. This cannot be done expeditiously with conventional klystron or traveling wave tube amplifiers because of their inherent gain limitations and cost.

Therefore, it is one object of this invention to provide a system for effectively amplifying a relatively low level microwave signal.

It is the primary object of this invention, however, to provide a system for producing a relatively high power microwave signal of predetermined frequency controlled by a signal of standard frequency outside the microwave range.

Figure 2:
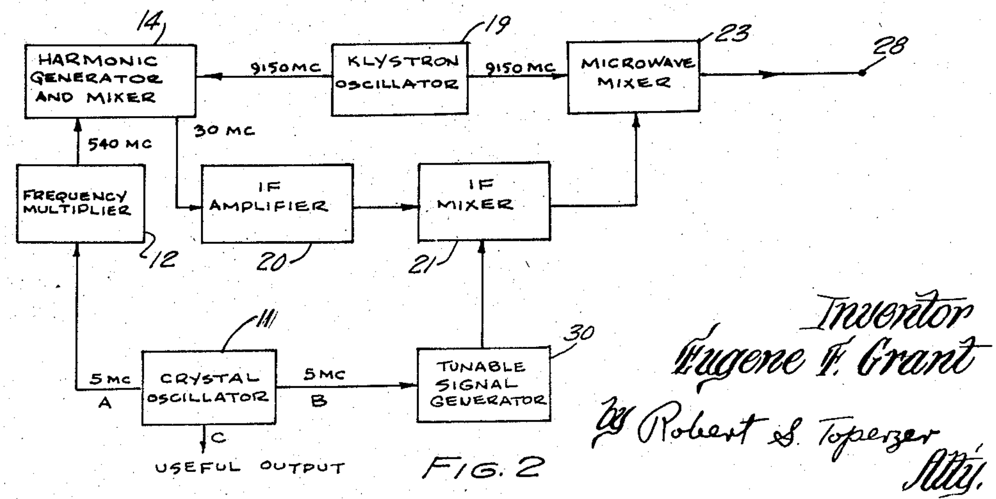

The novel features of this invention, together with further objects and advantages thereof, will become more readily apparent when considered in connection with the accompanying drawings wherein:

Figure 1 is a diagrammatic illustration of a preferred form of the system made according to the invention; and, Figure 2 is a diagrammatic illustration of another embodiment of the invention utilizing a tunable signal generator to provide a variable microwave signal in frequency.

With reference now to Figure 1, it will be observed that a crystal oscillator 11 having three separate output channels A, B and C is employed as a source of 5 mc. signals, an illustrative standard frequency, for controlling the relatively high power microwave signal of 9192.631830 mc. frequency to be derived. Coupled to output channel A of crystal oscillator 11 is a frequency multiplier 12, which may conveniently comprise a number of conventional frequency doubling and tripling stages in cascade, and coupled to the frequency multiplier in turn, is a harmonic generator 13. Harmonic generator 13 takes the form of a silicon crystal mounted in one of the wave guide sections or arms of a hybrid wave guide junction 14. Although the invention is not especially limited to any particular type of hybrid wave guide junction, one convenient type is the well known hybrid T junction comprising an E plane junction and an H plane junction symmetrically joined with two of their arms in common. A hybrid junction of this type adapted to operate as a balanced mixer by the provision of a pair of crystals in the respective common or symmetrical arms is described in detail in Patent No. 2,666,134, issued January 12, 1954, to R. H. Dicke. So also in the system according to the present invention, hybrid junction 14 has a pair of crystals 15 and 16 in its symmetrical arms 17 and 18, respectively, for like purposes.

Coupled to the H plane arm of the hybrid junction or mixer 14 is a klystron oscillator 19 designed to operate at a nominal 9150 mc., and coupled to both the crystals 15 and 16 is an intermediate frequency (IF) amplifier 20 for selectively amplifying a predetermined output signal from the balanced mixer. IF amplifier 20 in turn is coupled to one input circuit of a conventional vacuum tube IF mixer 21 and the other input circuit of the mixer 21 is coupled to a frequency synthesizer 22. Frequency synthesizer 22 is directly controlled in frequency by crystal oscillator 11 to which it is connected at output channel B, and by means of conventional frequency multiplying and dividing stages, as well as appropriate mixing stages, the synthesizer is adapted to provide an output signal whose frequency when added to the frequency of the klystron oscillator and the intermediate frequency to which the IF amplifier is tuned, yields the 9192.631830 mc. frequency associated with the desired microwave output signal. In other words, IF mixer 21 serves to provide an output signal whose frequency is equal to the sum of the frequencies of the signals from IF amplifier 21 and the frequency synthesizer 22, and when mixed with the klystron oscillator signal, yields a microwave signal of the desired atomic resonance frequency.

To accomplish this latter mixing function, there is provided a second balanced mixer 23 which may conveniently comprise a hybrid T wave guide junction identical with junction 14 and having like crystals 24 and 25 in its symmetrical arms 26 and 27, respectively. Such a mixer is described in detail in Patent No. 2,462,893, issued March 1, 1949, to P. J. Pontecorvo, the essential difference between mixer 23 and mixer 14 being that by virtue of the arrangement of the connections to the hybrid junction and the crystals associated therewith, the mixer 23 is adapted to provide an output signal of microwave frequency. Thus, crystals 24 and 25 are connected to the output circuit of IF mixer 21, and the E plane arm of the junction is coupled to klystron oscillator 19. The remaining arm of the junction, namely the H plane arm, serves as the output channel from which the desired microwave signal is obtained, a terminal 28 coupled to the H plane arm having been illustrated only to indicate more clearly the location of the output circuit or channel of the system.

In operation, frequency multiplier 12 serves to provide a signal whose frequency is equal to the 108th harmonic of the crystal oscillator frequency, namely 540 mc., and harmonic generator or crystal 13, owing to its nonlinear impedance characteristic, serves to excite in the E plane arm of the junction or mixer 14, various harmonics of the 540 mc. signal. The particular harmonic component signal of interest is the seventeenth harmonic or 9180 mc. That is to say, by virtue of the operation of balanced mixer 14 on the combination of the 9180 mc. signal and 9150 mc. klystron oscillator signal, there is presented to the input circuit of IF amplifier 20, an IF difference frequency signal of 30 mc. to which the IF amplifier is tuned. In effect, only this 30 mc. IF signal is transmitted to the IF mixer 21 because other signals of different frequency, resulting from the operation of the balanced mixer on various other harmonic components signals and the klystron oscillator signal, will be effectively filtered out by the amplifier.

Since the desired microwave output signal is to have a frequency of 9192.631830 mc., it follows that by the criterion aforementioned, the output signal from frequency synthesizer 22 must necessarily have a frequency of 12.631830 mc., so that when this latter frequency is added to the IF frequency and the klystron oscillator frequency, the desired 9192.631830 mc. frequency results. In a generally straightforward manner, synthesizer 22 is designed to provide just such a signal, and mixer 21 operates to combine this signal with the 30 mc. IF signal in a manner whereby a signal of 42.631830 mc. frequency is produced in the output of the mixer. This 42.631830 mc. signal is then combined with the 9150 mc. klystron oscillator signal in the balanced mixer 23 to produce the desired 9192.631830 mc. microwave signal which is transmitted via the H plane arm to the terminal 28. If it is desired specifically to select this 9192.631830 output signal to the exclusion of all others, appropriate filtering may also be provided between the H plane arm and the terminal 28. Also a modulated form of output signal may be conveniently provided for, if desired, by applying a modulation signal to the input circuit of mixer 21 to which the synthesizer 22 is coupled.

Although the klystron oscillator itself is not controlled in frequency by the crystal oscillator 11, according to the invention the frequency of the desired microwave output signal (9192.631830 mc.) nevertheless will be. In the case, for example, of a slight increase in the klystron oscillator frequency about 9150 mc., a corresponding decrease in the IF frequency will occur. As a result, when the IF frequency is effectively added first to the frequency of the synthesizer output signal and then to the frequency of the klystron signal, the sum thereof, corresponding to the frequency of the desired output signal, will remain the same. Likewise, should the klystron oscillator frequency decrease, the IF frequency will increase correspondingly with the net result that the frequency of the desired output signal again remains unchanged. The advantage of this system lies in the fact that klystron oscillator 19, need be controlled, if at all, only by a conventional automatic frequency control circuit, working off the intermediate frequency signal for example, and yet it is in large measure responsible for the power level of the desired output signal of absolutely controlled frequency. Thus, a relatively high power output signal of predetermined controlled frequency may be afforded simply by providing a klystron oscillator of correspondingly high power. Insofar as the signal from the mixer 21 contributes to the ultimate power level of the desired signal, no appreciable problem arises here because the IF signal and the output signal from the frequency synthesizer are both well outside the microwave range. Consequently, amplification thereof may be accomplished relatively easily, at least to the extent that the 42.631830 signal from the IF mixer has a power level as great as that of the klystron oscillator.

Those skilled in the art will recognize that the frequency synthesizing function might optionally be performed in association with the frequency multiplication function thereby eliminating, in effect, the need for the output channel B and the IF mixer 21. In fact, where it is not required that the crystal oscillator frequency be established independently of the desired output frequency, the frequency synthesizer 22 and the IF mixer 21 may both be eliminated. The reason is that the crystal oscillator frequency may then be subharmonically related to the desired output frequency so that by appropriate frequency multiplication and harmonic generation a signal of desired output frequency can be derived therefrom and injected directly into the balanced mixer 14. In this case, the system serves in effect as an amplifier in that a signal of like frequency but of relatively higher power level (as much as 50 db gain) will be provided in the H plane arm of the balanced mixer 23.

Another possibility is to replace the synthesizer 22 with a low frequency signal generator, disassociated from the crystal oscillator, which is tunable in small, accurately controlled increments. By means of this signal generator the frequency of the microwave output signal may be varied correspondingly about a stable center frequency which remains under the control of the crystal oscillator.

This system is illustrated in Figure 2. As shown therein, the tunable signal generator 30 is arranged to feed its output signal to the IF mixer 21, in place of the signal synthesized by the synthesizer 22 of Figure 1. This will permit the signal at the output terminal 28 to be varied about the frequency determined by the crystal oscillator 11.

Various modifications of this nature that are within the spirit and scope of the invention will no doubt occur to those skilled in the art and therefore what is claimed is:

1. A system for deriving a relatively high power microwave signal having a predetermined controlled frequency, said system comprising means to provide outside the microwave range a standard signal having a frequency which is subharmonically related to the desired signal of predetermined controlled frequency, means for deriving from the standard signal a harmonic signal whose frequency is equal to the frequency of the desired microwave signal of predetermined controlled frequency, means to provide a relatively high power microwave signal whose frequency is similar but unrelated to the frequency of the desired signal, means for mixing the relatively high power signal with the harmonic signal to obtain a signal of intermediate frequency equal to the difference frequency thereof, means for selectively amplifying the intermediate frequency signal, and means for mixing the amplified intermediate frequency signal with the relatively high power microwave signal to obtain the desired microwave signal of predetermined controlled frequency.

2. A system according to claim 1 including apparatus to vary the frequency of the desired microwave output signal, said apparatus comprising a tunable signal generator to provide a signal of relatively low selected frequency, and means for mixing said relatively low frequency signal with the amplified intermediate frequency signal.

3. A system for deriving a relatively high power microwave signal having a predetermined controlled frequency, said system comprising a crystal oscillator to generate a signal outside the microwave range having a standard frequency which is subharmonically related to the predetermined frequency of the microwave signal to be derived, a frequency multiplier coupled to the crystal oscillator to provide a signal whose frequency is harmonically related to the crystal oscillator signal, a harmonic generator coupled to the frequency multiplier to generate relatively higher order harmonic component signals including a component signal having the same frequency as the predetermined frequency, means to provide a high power microwave signal whose frequency is similar but unrelated to the predetermined frequency, means for mixing the relatively high power microwave signal with said harmonic component signal to obtain a signal of intermediate frequency equal to the difference frequency thereof, means for selectively amplifying the intermediate frequency signal, and means for mixing the amplified intermediate frequency signal with the high power microwave signal to obtain the desired microwave signal of predetermined controlled frequency.

4. A system for deriving a relatively high power microwave signal having a predetermined controlled frequency, said system comprising means for generating a signal of optional standard frequency outside the microwave range, means for deriving from the standard signal a microwave signal of harmonically related frequency, means for producing independently of the standard signal a high power microwave signal whose frequency is similar but unrelated to the frequency of the harmonic microwave signal, means for mixing the harmonic microwave signal with the high power microwave signal to obtain a signal of intermediate frequency equal to the difference frequency thereof, means for selectively amplifying the intermediate frequency signal, means for producing a signal whose frequency is controlled by the standard signal and when mixed with the intermediate frequency signal serves to provide a signal having a frequency equal to the difference in frequency between the high power microwave signal and the desired microwave signal of predetermined controlled frequency, means for mixing the signal whose frequency is controlled by the standard signal with the amplified intermediate frequency signal to obtain said last-named signal, and means for mixing said last-named signal with the high power microwave signal to obtain the desired microwave signal of controlled predetermined frequency.

5. A system for deriving a relatively high power microwave signal having a predetermined controlled frequency, said system comprising means for generating a signal of optional standard frequency outside the microwave range, means for deriving from the standard signal a microwave signal of harmonically related frequency, means for producing independently of the standard signal a relatively high power microwave signal having a frequency similar but unrelated to the frequency of the harmonic microwave signal, means for mixing the harmonic microwave signal with the high power microwave signal to obtain a signal of intermediate frequency equal to the difference frequency thereof, means for selectively amplifying the intermediate frequency signal, means for producing a signal whose frequency is controlled by the standard signal and when added to the frequency of the high power microwave signal and the frequency of the intermediate frequency signal yields the desired predetermined frequency, means for mixing the signal whose frequency is controlled by the standard signal with the intermediate frequency signal to obtain a signal whose frequency is equal to the sum frequency thereof, and means for mixing said last-named signal with the high power microwave signal to obtain the desired microwave signal of predetermined controlled frequency.

6. A system for deriving a relatively high power microwave signal having a predetermined controlled frequency, said system comprising a crystal oscillator to generate a signal of optional standard frequency outside the microwave range, a frequency multiplier coupled to the oscillator to provide a signal whose frequency is harmonically related to that of the standard signal, a harmonic generator coupled to the frequency multiplier to generate relatively higher order harmonic component signals including at least one component signal in the microwave range, means to provide a relatively high power microwave signal whose frequency is similar but unrelated to the frequency of the harmonic component signal in the microwave range, means for mixing the harmonic component signal with the high power microwave signal to obtain a signal of intermediate frequency equal to the difference frequency thereof, means for selectively amplifying the intermediate frequency signal, means for producing a signal whose frequency is controlled by the standard signal and when added to the frequency of the high power microwave signal and the frequency of the intermediate frequency signal yields the desired predetermined frequency, means for mixing the signal whose frequency is controlled by the standard signal with the intermediate frequency signal to obtain a signal whose frequency is equal to the sum frequency thereof, and means for mixing said last-named signal with the high power microwave signal to obtain the desired microwave signal of predetermined controlled frequency.

References Cited in the file of this patent

UNITED STATES PATENTS 2,725,556 Carter --------------- Nov. 29, 1955